(12) United States Patent
Ross

(10) Patent No.: US 8,974,192 B2
(45) Date of Patent: Mar. 10, 2015

(54) BIOMORPHIC WAVE ENERGY COLLECTOR

(76) Inventor: Gary Ross, Oxnard, CA (US)

( * ) Notice: Subject to any disclaimer, the term of this patent is extended or adjusted under 35 U.S.C. 154(b) by 767 days.

(21) Appl. No.: 13/068,810

(22) Filed: May 20, 2011

(65) Prior Publication Data

US 2012/0247097 A1  Oct. 4, 2012

Related U.S. Application Data

(60) Provisional application No. 61/396,091, filed on May 22, 2010.

(51) Int. Cl.
*F04B 17/00* (2006.01)
*F04B 35/00* (2006.01)
*F03B 13/10* (2006.01)
*F03B 13/12* (2006.01)
*H02P 9/04* (2006.01)
*F03B 13/18* (2006.01)

(52) U.S. Cl.
CPC ............... *F03B 13/188* (2013.01); *Y02E 10/38* (2013.01)
USPC ................ 417/330; 417/332; 290/42; 290/53

(58) Field of Classification Search
CPC ....................................................... Y02E 10/38
USPC ........................ 417/330, 332, 333; 290/42, 53
See application file for complete search history.

(56) References Cited

U.S. PATENT DOCUMENTS

| | | | | |
|---|---|---|---|---|
| 3,598,505 A * | 8/1971 | Greene et al. | ................. | 417/220 |
| 3,758,788 A * | 9/1973 | Richeson | ......................... | 290/42 |
| 3,961,863 A * | 6/1976 | Hooper, III | ................... | 417/334 |
| 5,329,497 A * | 7/1994 | Previsic et al. | ............... | 367/141 |
| 7,023,104 B2 * | 4/2006 | Kobashikawa et al. | ......... | 290/42 |
| 7,131,269 B2 * | 11/2006 | Koivusaari | ..................... | 60/495 |

* cited by examiner

*Primary Examiner* — Peter J Bertheaud
(74) *Attorney, Agent, or Firm* — Thomas I. Rozsa

(57) ABSTRACT

An apparatus utilizing wave energy to capture ocean water and send it to shore for hydroelectricity, hydrodynamic energy conversion or desalination. The submerged device is located offshore and is preferably oriented orthogonal to the shoreline or the incoming water surges. Responding to underwater wave surges, a deformable bladder filled with sea water is compressed and the seawater contained therein is expelled and sent to shore. A one-way valve responds to the differential in water pressure inside the empty bladder as compared to outside the bladder and permits seawater to enter and refill the bladder. The bladder may have any of several forms including that of a bellows. The present invention discusses several ways by which the bladder may be compressed and several ways by which it can sense and respond to underwater wave surges.

2 Claims, 8 Drawing Sheets

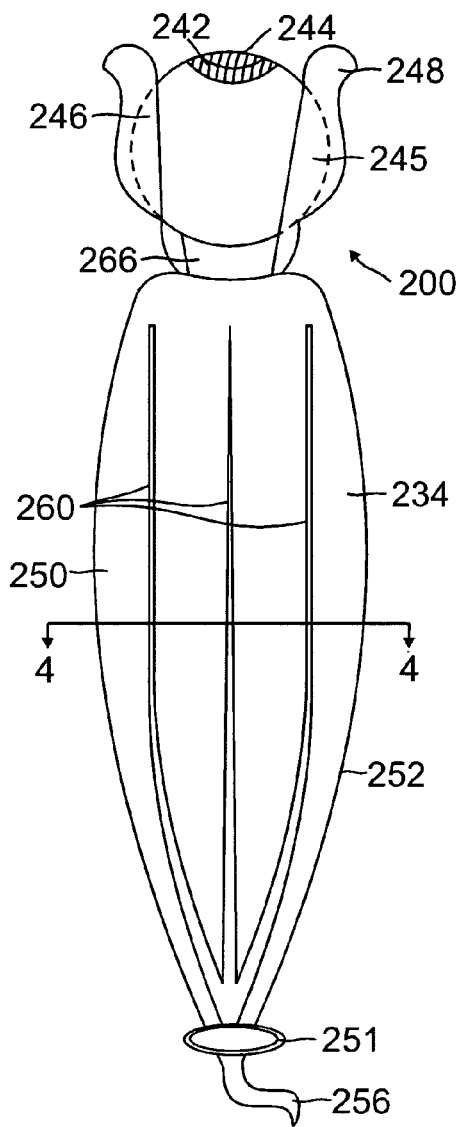
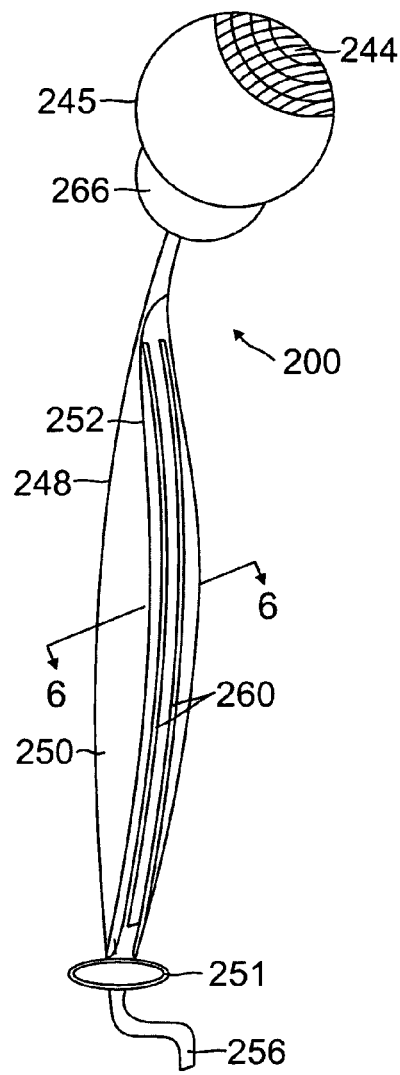
FIG. 3
FIG. 5
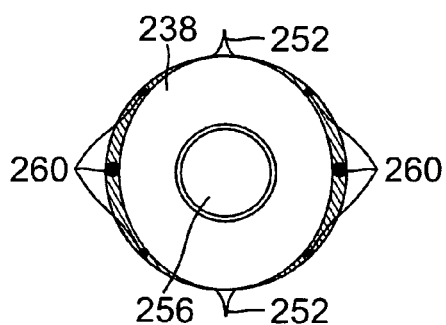
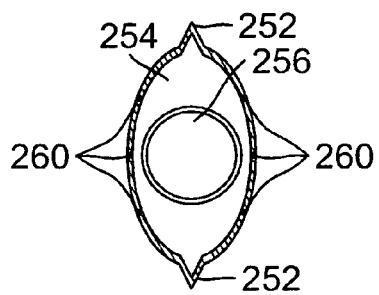
FIG. 4
FIG. 6

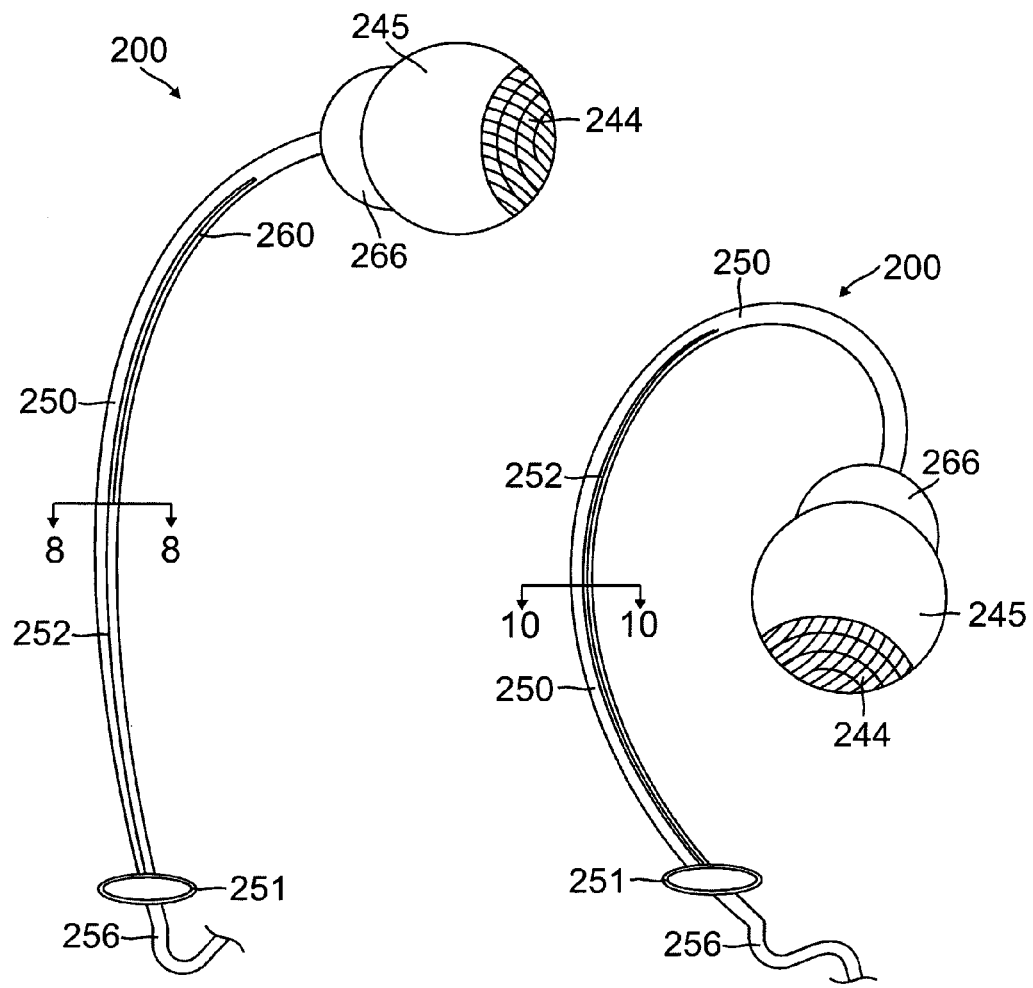
FIG. 7
FIG. 9
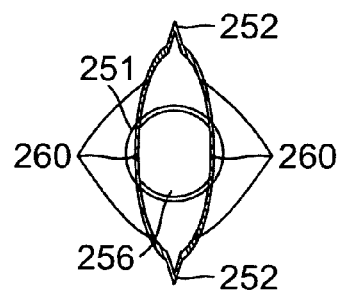
FIG. 8
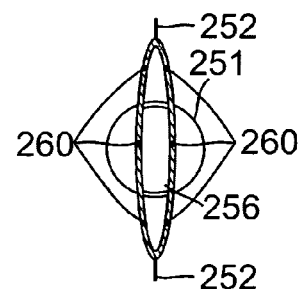
FIG. 10

BIOMORPHIC WAVE ENERGY COLLECTOR

CROSS-REFERENCE TO RELATED APPLICATIONS

This application claims priority from Provisional Patent Application Ser. No. 61/396,091 filed May 22, 2010.

BACKGROUND OF THE INVENTION

1. Field of the Invention

Efforts for finding green energy have increased for many contemporary reasons. To this end, offshore energy has been explored and has become very developed, yet, inshore wave energy has not been a topic of much exploration. Inshore waves are energetic and offer more kinetic energy than offshore energy. The energetic inshore waves also offer more challenges and efforts on the part of inventors and developers, such as access to the shore and inshore environment, conservation concerns, pollution, fouling, and spoliation of the equipment, as well as the shore and inshore environment, and creating articles that can withstand a hostile and changing environment.

2. Description of the Prior Art

Historic attempts, as well as the best current attempts, have focused on various mechanical ways of converting wave energy to bring water ashore and into a holding tank where it can be converted into energy with turbines. The Surf Power from Canada and the Wave Roller design from Finland both bring water ashore for processing using this idea with standard equipment. These two examples have mechanisms that involve a piston on leveraged structural elements, as in the Surf Power, or very large plates, as in the Wave Roller, that push a piston that converts the wave energy mechanically to force sea-water to the shore.

These systems seem to work but a major and expensive disadvantage and problem is that they are prone to failure and high maintenance because of the moving mechanical parts in the hostile and ever changing environment of the ocean. In addition to the problems with both of these and other devices caused by the mechanical aspects of the devices being under salt water, there are problems caused by sand and fouling agents which are very typical in any inshore environment. In addition, the resulting requirement of constant maintenance and repair is a significant problem. Another problem is that such devices are highly prone to breakage during epic wave events. Additionally, from an ecological and conservation point of view, a major problem with these devices is that they are very intrusive, unsightly, and interfere with sea life. Persons owning expensive ocean property, as well as persons enjoying the beach and shore, have often opposed the disruption of the ocean view and of sea life by man-made devices. The sound generated by the pistons of the prior art travel quite far under water. This has a negative effect on divers in the area, who also object to the unsightliness of such devices, and also on ocean life, because such prior art dissuades creatures from their ancient and natural habits, and also disrupts, annoys and harms such creatures with the mechanical noise and physical presence of the equipment.

These are some of the issues that developers take into consideration when considering inshore energy development. The nature and expense of these issues result in severely limiting the potential for these devices to be located anywhere inshore, offshore, or underwater, and the man hours and costs to keep, maintain, and replace the equipment adds to the cost to produce the electricity, as well as increasing the expense for the original equipment.

Contemporary energy harvesting devices for inshore environments should be durable, inexpensive, non-polluting, silent, non-intrusive, and also environmentally friendly. Moreover, it should be silent so as not to interfere with the above water and underwater environments. It should have as few moving parts as possible. The requirement that it be durable means it should be made of a material which is slow to degrade and when it does degrade, the material will not negatively impact the environment. It further should have minimal impact on the local underwater environment and preferably mimic local sea life.

Based on the foregoing, it is believed that none of the aforementioned prior art describe a wave energy collector which meets all of the stated requirements and resolves all of the above stated problems and disadvantages. Therefore, there appears to still be a need for a wave energy collector which meets all of the indicated objectives and resolves all of the indicated problems and disadvantages in a commercially viable product which can be readily manufactured, marketed, implemented, maintained and monitored at a reasonable price.

SUMMARY OF THE INVENTION

The present invention provides a unique method to translate wave energy by capturing ocean water and sending it to shore to be used for hydrodynamic energy conversion or desalination. While harvesting ocean waves is not a new topic, the approach presented here is new, very different, and far more useful from what has been proposed in the past.

The present invention involves a unique, biomorphic design that is absent from the industry and all prior art. The present invention is submerged, and using a bladder, in a generally bellow-like form, and an underwater vacuum-like property, the present invention utilizes the underwater wave energy to contract and expand the bladder to, respectively, force seawater to shore through a pipeline and/or hose and refill with seawater for the next cycle. One way flapper valves of preferably silicone or similar material trap the water in this bellow-like form and with compression caused by a wave, water is forced out an open pipe or hose that goes to shore. The present invention may be attached to a conduit or any other means to bring the water ashore, such as an artificial reef or Applicant's shoreline erosion mitigation device. The present invention provides water to shore 24 hours a day, seven days a week, and in all wave conditions. Five embodiments of the present invention biomorphic wave collectors are described herein, each having the same concept and function, yet having different aesthetics and suitability for active or mild wave environments.

The five embodiments of water collectors driven by wave energy are discovered and described herein. Other embodiments utilizing the concepts and teachings herein are within the spirit and scope of the present invention. All five of the embodiments discussed herein employ at least one one-way water intake valve, a fish screen, a deformable bladder to collect water, a means by which the device catches the wave energy, a means by which the bladder is compressed, and an egress for the extrusion of water from the device to shore. The emptied bladder will refill due to the imbalance of the water pressure inside the emptied bladder as compared to the water pressure outside the bladder. They may also have a flotation means at the end away from the water egress to facilitate the device's ability to catch the energy of a wave and also to give the device an orientation. There may also be some means to attach the present invention to a conduit or pipe and the like to facilitate the transfer of water to shore. After the sea water is extruded, the water is piped ashore where it can be used for any number of purposes, including generating hydroelectric energy. The water can be used or desalinated or returned to the ocean.

High Surf Design

Preferred embodiments for an environment with very active and high surf should preferably have a lower profile relative to the entire body, and be a generally horizontal weighted hinged collector having a flexible bladder between two plates in parallel for medium and heavy wave events and is attached to at least one, if not more, conduits that go to shore. The device should be aligned and attached such that the faces of the plates are parallel to the shore. Each plate has its own independent hinge elements, yet the two plates are connected to each other such that each can push/pull on the other. When wave forces push against the ocean-facing plate, the ocean-facing plate in turn pushes against the shore-facing plate. This results in decreasing the physical space between the two parallel plates. When the two plates lean towards each other, in one direction or the other, such action results in squeezing the bladder that resides between the two plates, thereby squeezing the water out of the bladder through an open hose or hoses of the bottom of the collector. The water will be forced out and to the shore. A flotation means on the collector will bring the parallel plates upward again, thus expanding the bladder to create suction to fill the bladder with sea-water again for another cycle. Any energetic force going back out to sea will act to straighten the form. This action will create suction to force water back into the collector through the one-way valve to refill the bladder. If no wave force is acting on the collector, the flotation means designed in the collector encourages water to be sucked back in the bladder even without wave energy. The flotation means provides this straightening affect if insufficient current is present. In epic events, the present invention will continue to move back and forth and so all aspects of the present invention are designed to withstand the forces. Any movement will translate into the result of water being sucked into the collector and forced out. In small waves, the present invention is designed to intermittently grab and send water but to a lesser degree.

There are several materials that can be used for the present invention that meet the previously stated requirements. By way of example, the plates of the present invention may be constructed of aircraft aluminum or stainless steel. Also, there are many flexible materials from which the bladder may be made. The flotation means should be constructed of material that can bring the plates aggressively back to the start position, perpendicular to the plain of the pipes to which the present invention is attached. While the present invention may be of any size necessary to fulfill its function, the wave energy collectors of an embodiment for an active wave environment are preferably six to twelve feet wide and four to eight feet tall. The plumbing can be in several hoses. Multiple replaceable one-way flapper valves are located on one or both plates that will allow water to enter easily and quickly and stop flow when pressure on the inside of the bladder is higher than the outside pressure. The one way valves, as well as the bladder, should be durable, and also be easily replaceable.

Low Surf Design

The embodiments of the present invention for a mild or low surf environment is preferably a more vertical design that is attached on one location to one conduit. While the embodiment may take on any form necessary to complete its function, the preferred embodiment is four to twelve feet tall and twenty-four to thirty-six inches wide. It may be made from a molded form and the preferred embodiment has the general appearance of a frond from a sea water plant. The top of the frond has a "bulb" and "petals" or "leaves" and the "stem" portion of the frond contains the bladder. The flotation means may be in the bulb, the petals or leaves, or both. The bulb also houses at least a one-way valve. Similar to the previously discussed embodiment, when there is little or no current, the flotation means will bring the wave energy collector upward. When there is wave movement, this embodiment is forced to bend to one side. As this embodiment is forced to one side, it will bend and this bending decreases the inner volume of the bladder. The water will be forced out the open hose that goes out the bottom of the wave energy collector and to the shore. The absence of force will create suction with even a slight difference of water pressure inside the collector compared to outside the collector, thus allowing the water to refill the bladder for the next cycle. Additionally, springs, stiffeners, or an outside post may be included to facilitate the compression of the bladder of this embodiment.

When a directional wave force is applied to this embodiment, the frond naturally will flex downwardly, starting at the top of the frond and continue in a methodical way downward towards the stiffer part of the wave energy collector. The wider profile at the top will orient perpendicular to the wave force. Multiple wave energy collectors will be fixed on the conduits and will bend in the direction of the waves, towards the beach. The fully flexed wave energy collector will exert force on the bladder, thereby forcing the water out of the open pipe at the bottom of the collector. Any energetic force going back out to sea will act to straighten the frond and assist with the flotation means to encourage water to be sucked back in the wave energy collector again. The flotation means will provide this straightening affect even if little or no current is present. When there are only small waves or gently rocking waves, water will be ejected from the frond embodiment of the present invention with small, even pulses. During epic wave events, the frond embodiment of the present invention will stop extruding water because the frond embodiment remains bent over in the big waves, without the opportunity to straighten up, decompress the bladder and take in more water. However, this embodiment must be durable and hardy enough to withstand such huge forces.

Various additions and modifications may be made to this embodiment. Ribs can be added or spring stainless steel to add more stiffness and strength. The entire wave energy collector also can be made of an accordion like form to increase flexibility, each step will have a living hinge. The final design must accommodate a controlled flex. Like a fishing pole, the present invention must bend and flex, not crimp and not break. The shape and size of floatation means at or near the top of the collector also has functions to cause resistance against the directed wave energy. The bulb shaped top of the frond embodiment, as illustrated is preferred because it provides both more flotation and more wave resistance. One or more one-way flapper valves allow water to enter easily and quickly and stop flow under pressure and must be designed to last or be easily replaced.

This embodiment of the present invention wave energy collector may also rotate about its bottom attachment point to orient to any swell direction or if in an accordion shape move easily in any direction.

These are but two of the multiple embodiments presented herein. Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is an elevational view of the second embodiment of the preferred invention, illustrating full bladder expansion;

FIG. 4 is an enlarged, cross-sectional view taken in the direction shown in FIG. 3;

FIG. 5 is an elevational view of the second embodiment of the preferred invention, illustrating the beginning of bladder compression;

FIG. 6 is an enlarged, cross-sectional view taken in the direction shown in FIG. 5;

FIG. 7 is an elevational view of the second embodiment of the preferred invention, illustrating partial bladder compression;

FIG. 8 is an enlarged, cross-sectional view taken in the direction shown in FIG. 7;

FIG. 9 is an elevational view of the second embodiment of the preferred invention, illustrating complete bladder compression;

FIG. 10 is an enlarged, cross-sectional view taken in the direction shown in FIG. 9;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
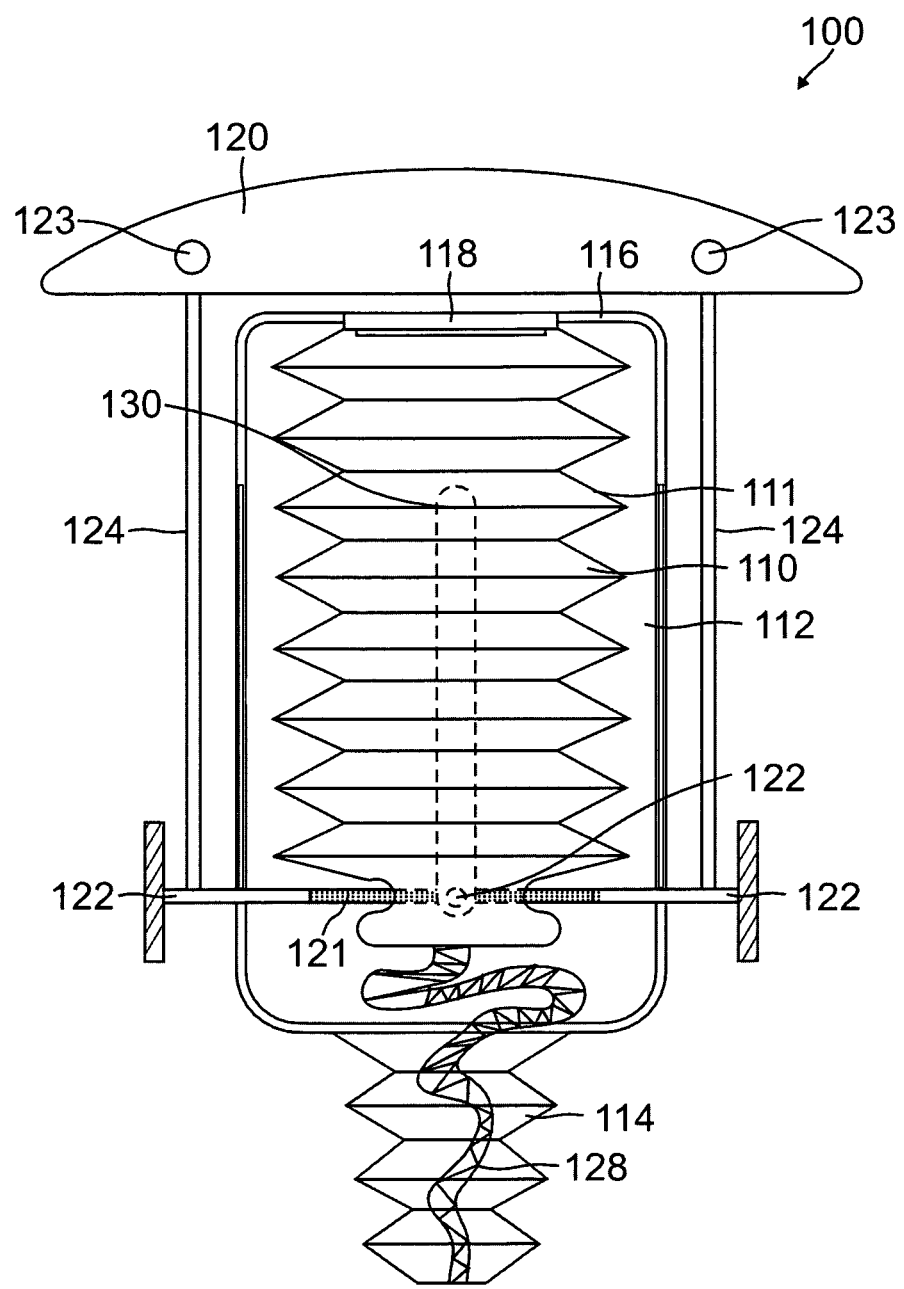
FIG. 1 is a plan view of the embodiment of the present invention.
Figure 2:
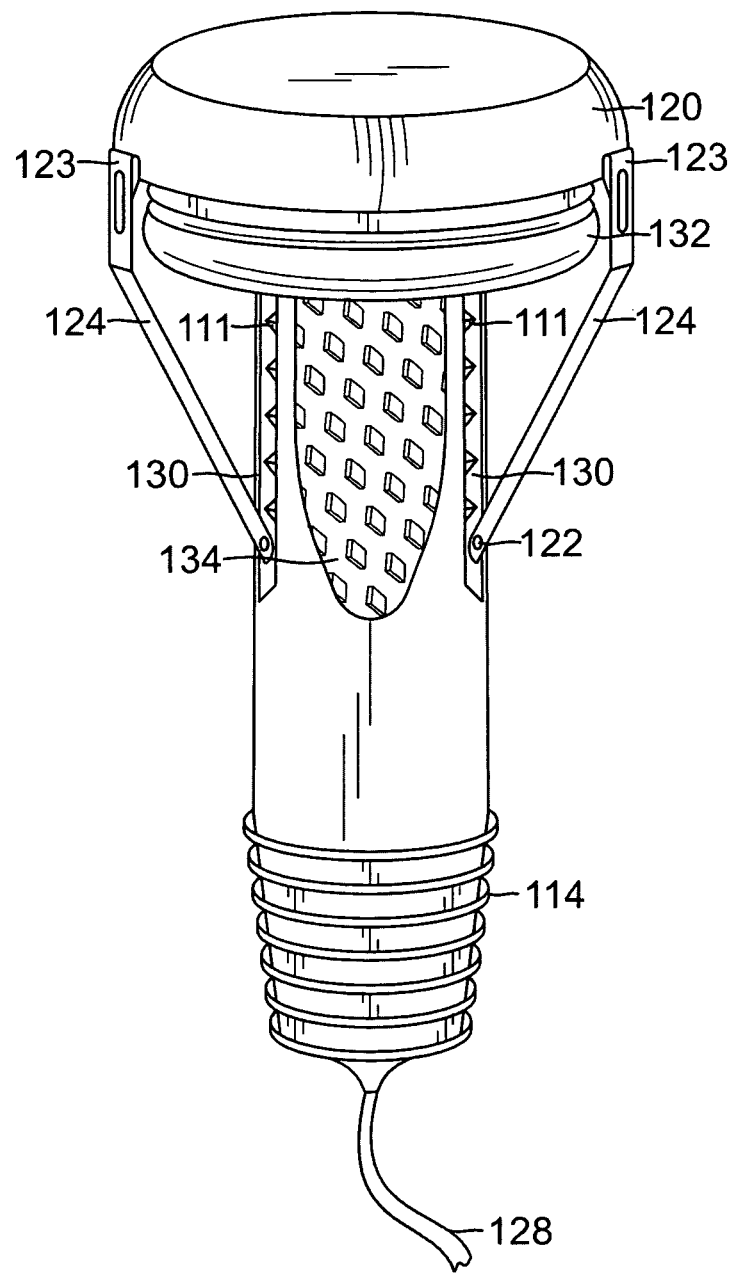
FIG. 2 is a perspective view of an exemplary exterior of the preferred embodiment of the present invention.

Referring now to FIGS. 1 and 2, there is shown the first embodiment, which is named the Hydroid design, of the present invention biomorphic wave energy collector. The Hydroid 100 has bladder 110, in a bellow-like shape, residing in a tubular housing 112. The bladder 110 of the Hydroid 100 has pleats 111 that allow the bladder to easily compress and expand. The bladder 110 shown in FIG. 1 illustrates the bladder 110 fully expanded. The top 116 contains a one-way valve 118. The bladder 110 is attached to the housing 112 at the top 116 of the housing 112 at the point where the one-way valve 118 resides, which allows sea water to enter the bladder 110. The bladder 110 also has an outlet 128, which leads toward shore and is preferably a hose-like device.

The housing 112 has a flexible bottom 114 which can attach to a conduit and which must be strong enough to withstand tidal and wave forces. Passing through the bottom 114 of the housing 112, is an outlet 128 that runs from the bladder 110 through the bottom 114 of the housing 112 through a pipe or conduit and on to shore. Additionally, a grip 134 may be added to the exterior of the housing 112 so as to facilitate divers who are servicing the Hydroid 100.

A wave collector 120 floats above the housing 112 of the Hydroid 100. The wave collector 120 preferably has a floatation means 132 that may be incorporated anywhere on, in or beside the wave collector 120. The wave collector 120 is attached to at least one strut 124 by a first attachment means 123. At the other end of the strut 124 is a second attachment means 122. The second attachment means 122 attaches the strut 124 to a pressure plate 121. At several locations along the housing 112 are slots 130 cut through the body of the housing 112, and the struts 124 may travel up and down along the open areas of their respective slots 130. Within the housing 112, the pressure plate 121 surrounds a lower portion of the bladder 110.

When the wave collector 120 experiences the underwater surge of a wave, the wave collector 120 is tugged by that directional force and the wave collector 120 moves upwards or away from the housing 112 of the Hydroid 100. The flotation means 132 exerts its own upward force, which must be overcome by the wave surge. The pulling on the wave collector 120 by the directional force of a wave surge results in the transfer of force to all items that are attached to the wave collector 120, meaning, the struts 124 following the movement of the wave collector 120 move upwardly along their respective slots 130 which in turn pull the pressure plate 121 upwardly as well. The upward movement of the pressure plate 121 results in a decrease in volume of the bladder 110, which folds along its pleats 111, and the sea water contained in the expanded bladder 110 has nowhere to go but through outlet 128. When the surge has passed, the flotation means 132 brings the Hydroid 100 to a relatively upright position, the one-way valve 118 allows water to enter the bladder 110, the bladder 110 expands as it is refilled thereby lowering the pressure plate 121, which further assists in bringing the wave collector 120 to a position hovering over the top 116 of the housing 112.

Referring now to FIGS. 3 through 10, there is shown a second embodiment of the present invention, designated the Frond 200, illustrating one full cycle of the Frond 200 beginning with full expansion, as illustrated in FIGS. 3 and 4, and ending with full compression, as illustrated in FIGS. 7 and 8.

The Frond 200 has a bulbous top 245 with a neck 266. Inside the bulbous top 254 is at least one one-way intake valve 242 covered by a fish screen 244. The bulbous top may have petals 246, as shown in FIG. 3, or may not, as shown in FIGS. 5, 7 and 9. A flotation means may reside in the bulbous top 245, the petals 246, the neck 266, or any combination thereof. A deformable, oval-shaped bladder 250 extends the length from the neck 266 to an attachment means 251, where the Frond 200 is removeably attached, preferably to a conduit or pipe. Extending from the base of the deformable bladder 250, beyond the attachment means 251 is an outlet 256, which preferably runs the length of the above mentioned conduit or pipe to bring the sea water to shore.

The bladder 250 has texture 234 to provide a grip for divers who are servicing the Frond 200. Along the faces of the oval-shaped bladder are ribs 260, which, although flexible, are stiff and provide a certain amount of rigidity and resistance to the bladder 250 bending.

In FIGS. 3 and 4, the Frond 200 is shown at the beginning of a cycle, unaffected by an underwater surge. The flotation means located in the top 245, the petals 246, the neck 266 or any combination thereof, has brought the Frond 200 to a vertical position. The bladder 250 is preferably at maximum volume and completely filled with sea water.

FIGS. 5 and 6 illustrate the Frond 200 beginning to experience the onset of an underwater surge. The top 245 and neck 266 begin to bend in the direction of the force of the surge. This bending causes the upper part of the bladder 250 to flatten and compress, and, as will be shown, the bladder 250 will continue to compress from the top downward against the ribs 260, thereby squeezing the sea water out of the bladder 250 from the top downward and out through the outlet 256. FIGS. 7 and 8 illustrate the Frond 200 at nearly full compression. It can be seen that the ribs 260 provide a stiffness and resistance against which the deformable bladder 250 is pressed and which facilitate the compression of the bladder 250. It can be seen that the ribs 260 can be made of several or varying materials to provide lesser and greater resistance along the length of the bladder 250. FIGS. 9 and 10 illustrate the Frond 200 at complete bladder 250 compression and completely bowed over by the surge of water. All seawater within the bladder 250 has been forced out through the outlet 256 and sent to shore.

At the end of the surge, the Frond 200 is buoyed vertically by both the flotation means located in the top 245, the petals 246, the neck 266 or any combination thereof, and by the refilling of the bladder 250 through the one-way intake valve 242 due to the differential in water pressure inside and outside the bladder 250, and the Frond is again in the position shown in FIGS. 3 and 4. Thus it can be seen that the Frond is particularly effective in mild surf environments and is able to respond to gentle surges in underwater current and can send pulses of pressurized water to shore continuously. The ability of the attachment means 251 to swivel like a weather vane will further maximize the efficacy of the Frond 200. It can be seen that the Frond 200 very closely mimics the appearance and movement of sea plants.

Figure 11:
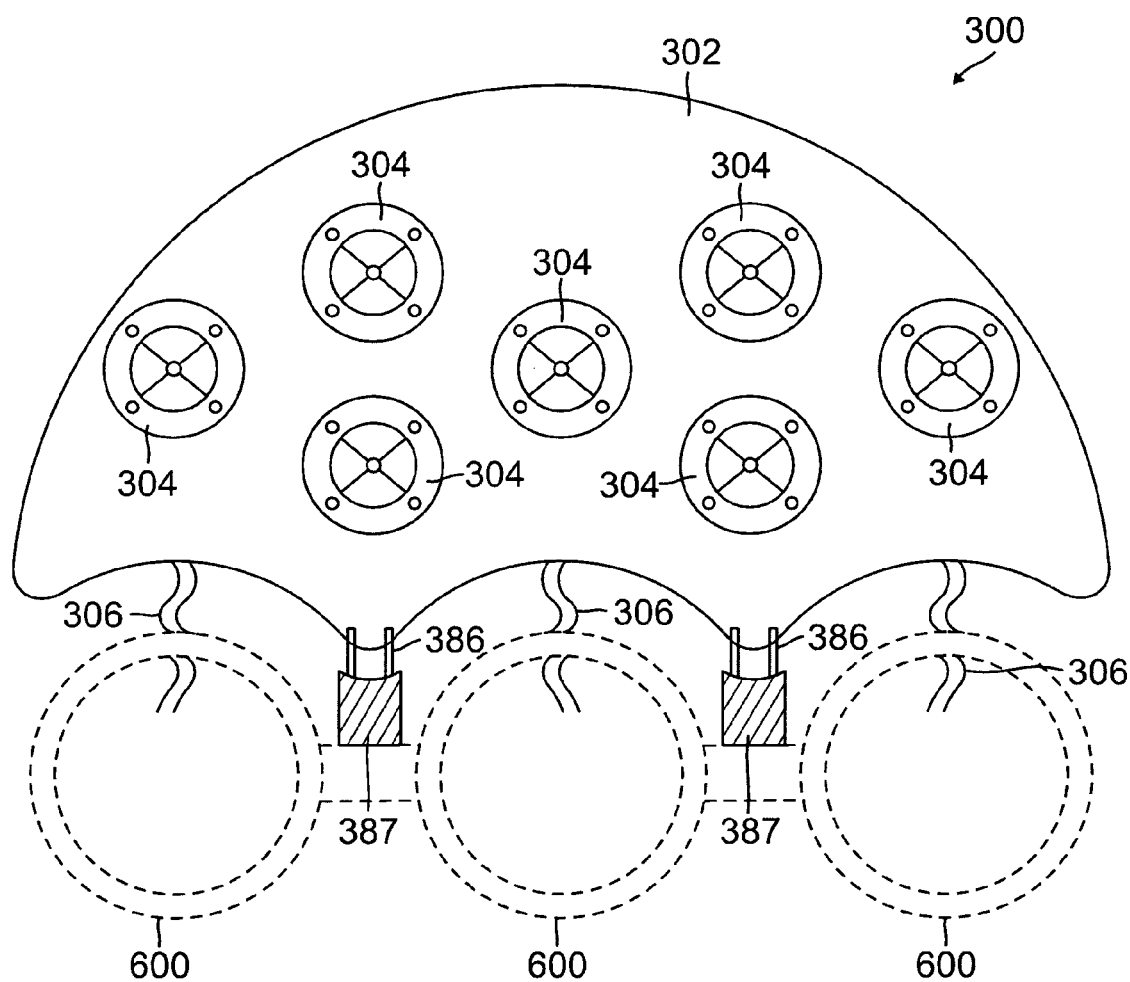
FIG. 11 is a partial, side, cutaway view of the third embodiment of the present invention, illustrating the device in full bladder expansion.
Figure 12:
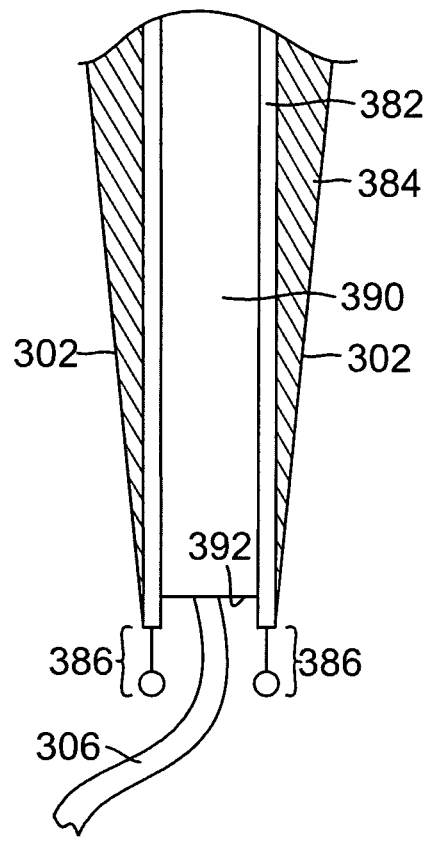
FIG. 12 is a side, cutaway view of the third embodiment of the present invention, illustrating nearly complete bladder expansion.
Figure 13:
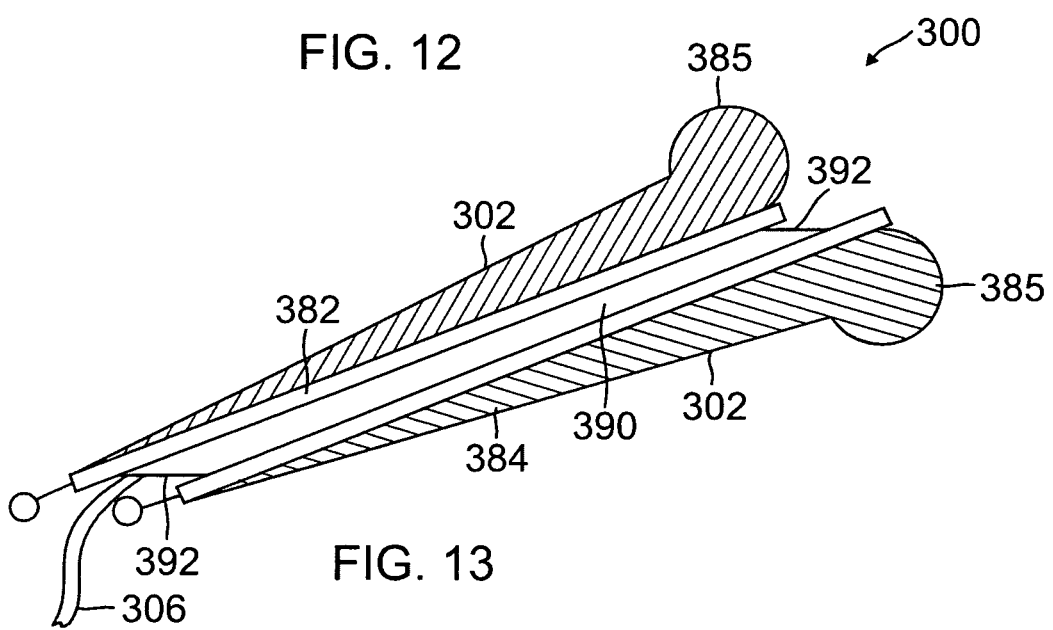
FIG. 13 is front elevational view of third embodiment of the present invention, illustrating nearly complete bladder compression.

Referring now to FIGS. 11, 12 and 13, there is shown a third embodiment of the present invention, designated the Tivela 300. The Tivela 300 has two face plates 302, each of which have a base form 382 which is preferably of a rigid or stiff material and preferably has a curvilinear profile. The curvilinear profile is preferred because it is reminiscent of the shapes of sea life and sea creatures and will have less negative impact of the visual environment. Preferably on the exterior each face plate 302, on the base form 387, is a flotation means 384 and along the upper perimeter of each face plate 302 is an extra quantity of flotation means 304 such that it forms a rim 385 protruding on the exterior of each face plate 302. Along the bottom of each face plate 302 is at least one attachment means that allows swaying movement of the face plates 302, which is illustrated in FIGS. 11 through 13 as having a plurality of independent hinges 386 each attached to a corresponding base 387 for stability, and which are releasably attached for ease of repair and maintenance of the Tivela 300.

The Tivela 300 has two face plates 302 oppositely positioned and spaced apart, such that the flotation means 384 on each face plate 302 is facing outwardly and the sides of the face plates 302 having only the base form 382 are facing each other. Enclosing the Tivela 300 along the perimeters of each of the face plates 302 is a structural wall 392 preferably made of deformable material. The structural wall 392 fully seals the interior of the Tivela 300, thereby forming a bladder 390. At the bottom of the Tivela 300 and through the structural wall 392 is an outlet 306, which is shown in the figures as a hose or tube-like device that can enter a conduit or pipe 600 to carry extruded sea water ashore. Located about each face plate 302 is at least one one-way valve 304 to allow the intake of sea water into the Tivela 300.

The Tivela 300 is submerged and oriented such that the face plates 302 are generally parallel to shore. In this manner, the Tivela 300 may receive the maximum directional force from underwater wave surges. The starting position of the cycle for the Tivela 300 is shown in FIG. 12, in a generally upright position, with each face plate 302 parallel to each other, the bladder 390 is at its maximum volume and is filled with sea water. When the Tivela 300 experiences the underwater surge of a wave, the face plate 302 facing the surge is pushed towards the shore and the shore facing face plate 302 is also pushed towards shore, as shown in FIG. 13. The flotation means 384 and the flotation rim 385 exerts their own upward force, which must be overcome by the wave surge. The tandem, swaying movement of the face plates 302 results in a decrease in volume of the bladder 390, and the sea water contained in the formerly expanded bladder 390 has nowhere to go but through outlet 306. When the surge has passed, the flotation means 384 and the flotation rim 385 brings the Tivela 300 to a relatively upright position. Due to the differential in pressure between the open ocean and the emptied bladder 390, the at least one-way valve 304 allows water to enter and refill the bladder 390. Thus, pulses of pressurized sea water course through the outlet 306. The outlet 306 is preferably long enough to carry the water ashore for various purposes.

Figure 14:
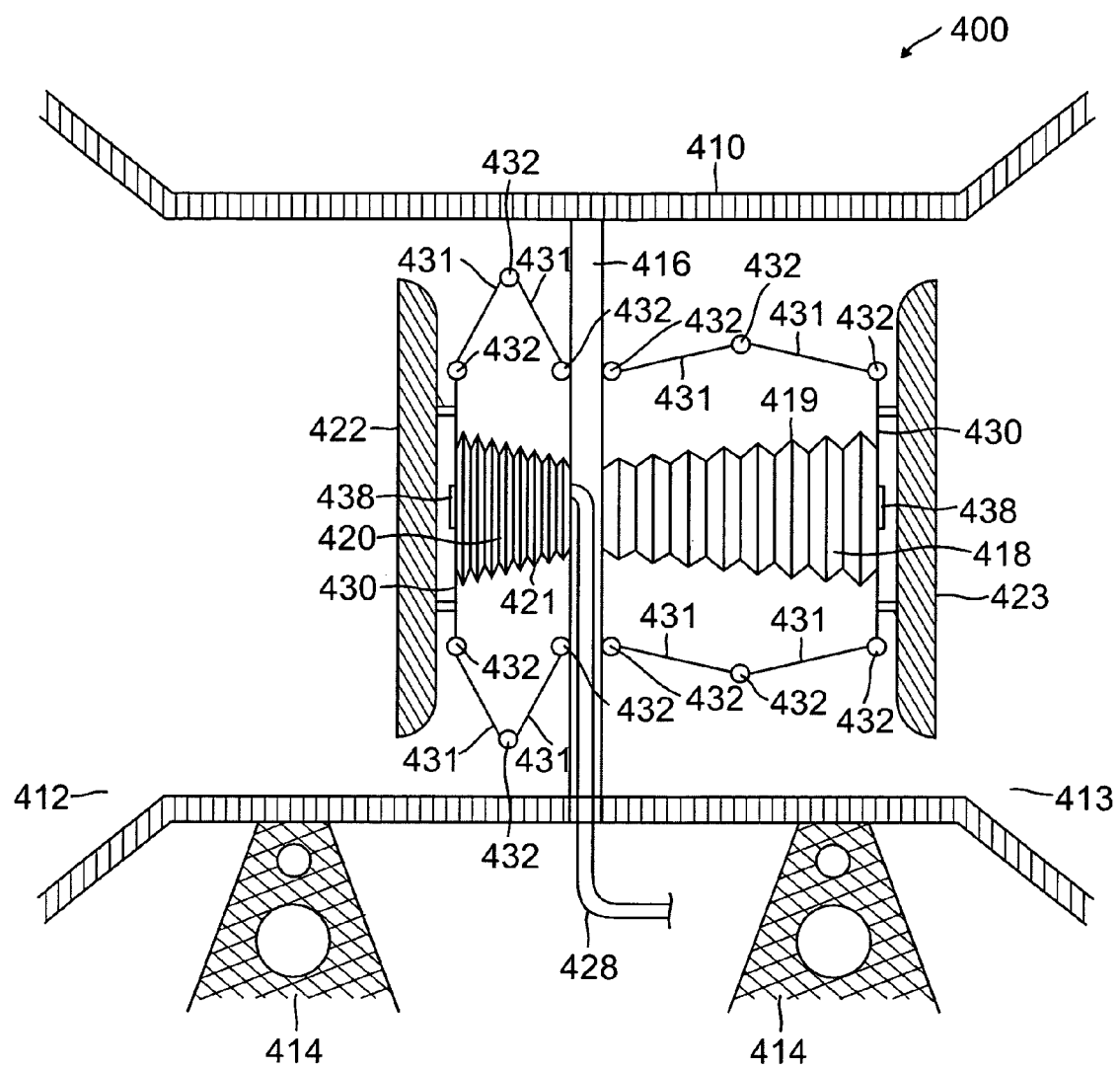
FIG. 14 is a plan view in partial cut-away of a fourth embodiment of the present invention.

Referring now to FIG. 14, there is shown a fourth embodiment of the present invention, designated the Turbo Hydra 400. The Turbo Hydra 400 is similar, physically and functionally, to the Hydroid 100, but has a double bellows system and a corresponding support structure.

The Turbo Hydra 400 has two bellow-shaped bladders, a first bellow 418 and a second bellow 420, which each have pleats 419, 421 respectively. A water permeable wall 416 separates first bellow 418 from second bellow 420. Both first bellows 418 and second bellows 420 have their own outlet 428. At the distal end of each of the two bellows 418, 420, is an endplate 430. At least one one-way intake valve 438 resides on each endplate 430. Connecting each endplate 430 to the wall 416 are a combination of support struts 431 and hinges 432, which work to fold and unfold, thereby facilitating the movement and function of the Turbo Hydra 400. Attached to each endplate 430 and not blocking or inhibiting the flow of sea water into the intake valves 438, is a wave collector 422, 423.

The Turbo Hydra 400 requires a sturdy support device, which is illustrated as a foreshortened tunnel or pipe 410 having a bottom support 414 of some kind. This may be part of an artificial reef. The pipe 410 has two openings 412, 413 one at each end and the Turbo Hydra 400 is releasably attached to the pipe 410 by the wall 416, preferably at both ends of wall 416, and transversely to the pipe 410, such that the wave collectors 422, 423 are oriented in the direction of the openings 410 of the pipe 410. It can be seen that the wall 416 does not move and that the elements of the Turbo Hydra 400 that are on either side of wall 416 are the only elements that move. The pipe 410 is oriented such that the openings 412, 413 are parallel to shore, and, correspondingly, each wave collector 422, 423 is parallel to the shore.

The entire device, Turbo Hydra 400 and its pipe 410, are completely submerged. As waves roll to shore, the underwater surge will enter the pipe 410 at opening 412. When the wave collector 422 experiences the underwater surge of a wave, the wave collector 422 is pushed by that directional force and the wave collector 422 moves towards wall 416 because hinges 432 allow the struts 431 to move and second bellows 420 compresses along its pleats 421. The volume of second bellows 420 decreases and the sea water contained therein is pushed through the outlet 428 and on to shore.

Correspondingly, as the surge passes through wall 416, the surge pushes on wave collector 423, the struts 431 on that side of wall 416 flatten at the hinges 432 and first bellows 418 is extended to increase its volume and the differential in pressure between inside and outside first bellows 418 causes its intake valve 438 to allow sea water to enter and fill first bellows 418. This is the condition illustrated in FIG. 14.

Correspondingly, when the surge of sea water from shore out to sea occurs, the surge enters the pipe 410 at opening 413, wave collector 423 experiences the underwater surge of a wave, the wave collector 423 is pushed by that directional force towards wall 416 because hinges 432 allow the struts 431 on that side of wall 416 to move and first bellows 418 compresses along its pleats 419. The volume of first bellows 418 decreases and the sea water contained therein is pushed through its corresponding outlet, not shown, and on to shore. As the surge passes through wall 416, the surge pushes on wave collector 422, the struts 431 on that side of wall 416 flatten at the hinges 432 and second bellows 420 is extended to increase its volume and the differential in pressure between inside and outside second bellows 420 causes its intake valve 438 to allow sea water to enter and fill second bellows 420.

Figure 15:
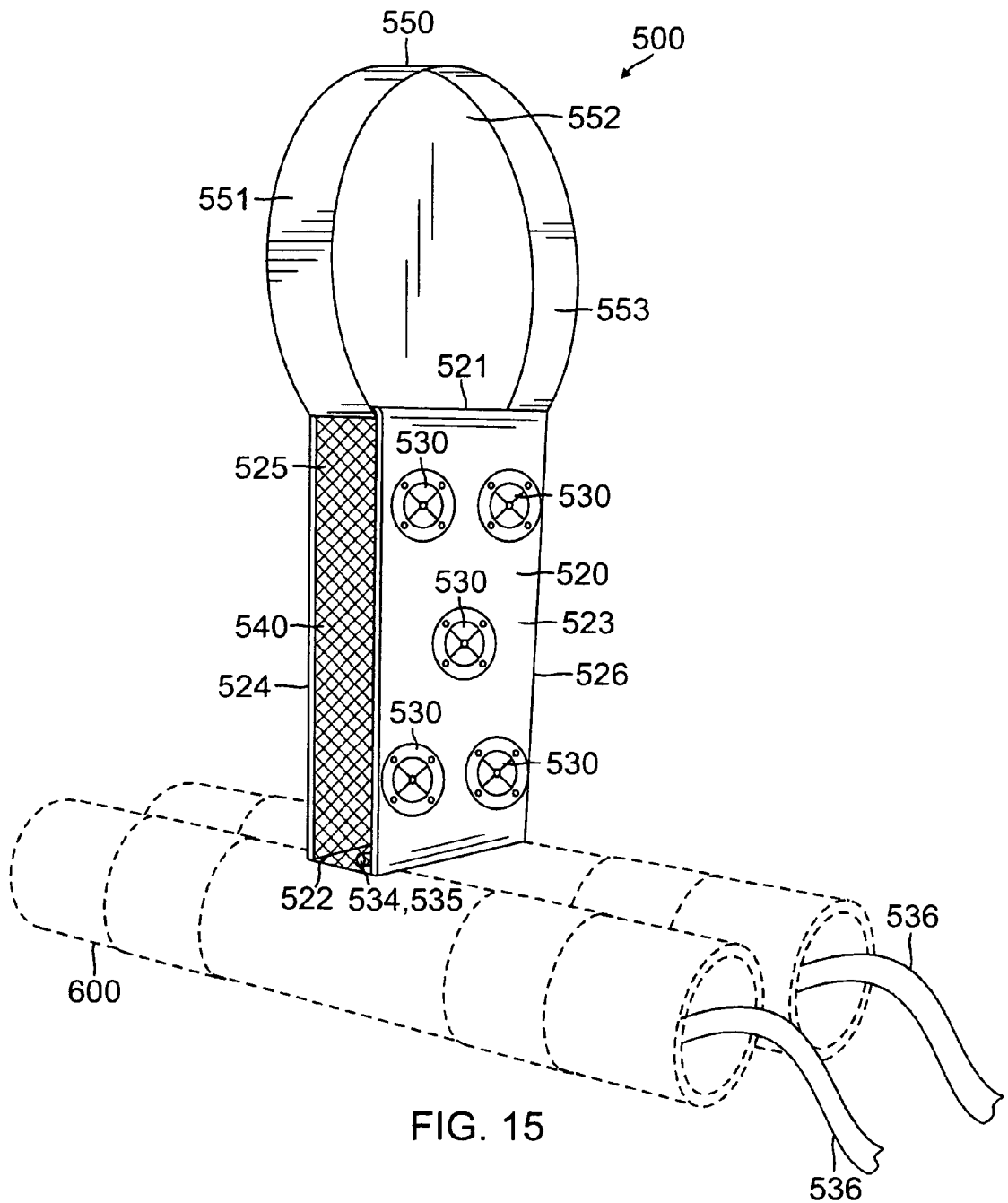
FIG. 15 is a perspective view of a fifth embodiment of the present invention.

Referring now to FIG. 15 there is shown a fifth embodiment of the present invention, designated the Sea Fan 500. The Sea Fan 500 has a generally six-sided, rectangular housing 520, of which four of the sides 521, 522, 523, 524 are generally rigid and two sides 525, 526 are deformable. All six sides 521, 522, 523, 524, 525, 526 are flexibly connected to each other and create a sealed interior bladder 540. Side 521 and side 522 are positioned opposite each other; side 523 and side 524 are positioned opposite each other; and side 525 and side 526 are positioned opposite each other. Each opposing pair of sides have identical dimensions, such that side 521 and side 522 have the same length and width, side 523 and side 524 have the same length and width, and side 525 and side 526 have the same length and width. The housing 520 is preferably oriented such that the two rigid sides 521, 522 having the smaller surface area are the top and bottom of the housing 520, and the two rigid sides 523 and 524 having the larger surface area are the sides perpendicular to the wave surge. Each pair of sides are generally parallel to each other and because each pair of sides have the same dimensions and because the sides are flexibly connected to each other, the housing 520 may move to and fro, yet each pair of rigid sides 521 and 522, 523 and 524 still remain generally parallel to each other.

On the housing 520, there is at least one one-way intake valve 530. The interior of the housing 520, as defined by the four rigid sides 521, 522, 523, 524 rigid and the two deformable sides 525, 526, act as the bladder 540 for this embodiment. The bottom side 522 is releasably attached to a conduit or pipe 600, by means of an attachment means 534 which also may serve as an outlet 535. A hose 536 is attached to the other side of the attachment means 534 which lies within the pipe 600 and is of sufficient length to reach the shore and beyond, as required.

Residing on the top side 521 of the housing 520 is a wave collector 550. The wave collector 550 is shown as having a generally circular shape, but may be of any shape necessary to fulfill its function. The wave collector 550 is preferably double-sided, with a circumferential wall 551 and a central surface 552, which may be flat, as shown, or curved, which is located midway along the circumferential wall 551 such that the wave collector 550 preferably works equally in either direction.

The Sea Fan 500 is submerged and oriented so that the wave collector 550 is generally parallel to shore and incoming waves. When the wave collector 550 experiences the underwater surge of a wave, the wave collector 550 is pushed by that directional force and the wave collector 550 moves laterally and downwardly, as does the housing 520 of the Sea Fan, with side 522 remaining stationary, side 521 moving laterally and downwardly and parallel to side 522, sides 523 and 524 swayed to one side, yet remaining parallel to each other, and sides 525 and 526 deforming and shrinking in area. The flotation means 553 exerts its own upward force, which must be overcome by the wave surge. The tandem, parallel movement of the three pairs of sides results in a decrease in volume of the bladder 540 and the sea water in the bladder 540 is forced out of the bladder 540 through outlet 535. When the surge has passed, the flotation means 553 brings the Sea Fan 500 to a relatively upright position, the bladder 540 is again at maximum volume and the differential in pressure inside and outside the bladder 540 causes the one-way intake valve 530 to allow water to enter the bladder 540, and thus the Sea Fan 500 is ready to start the cycle when the next wave surge occurs.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A biomorphic wave energy collector apparatus submerged in and used in conjunction with sea water adjacent a coastal shoreline, the apparatus comprising:
   a. a deformable submergible bladder configured to operate when submerged in the sea water, the deformable submergible bladder further enclosed by four rigid submergible plates and two transverse deformable submergible walls,
      i. the four rigid submergible plates including a first rigid submergible plate having a top side and a parallel spaced apart bottom side, a first lengthwise side and a parallel spaced apart second lengthwise side, a second rigid submergible plate having a top side and a parallel spaced apart bottom side, a first lengthwise side and a parallel spaced apart second lengthwise side, the first rigid submergible plate spaced apart from and parallel to the second rigid submergible plate, a first transverse rigid submergible plate having a first end side and a spaced apart parallel second end side, a first transverse lengthwise side and a parallel spaced apart second transverse lengthwise side, a second transverse rigid submergible plate having a first end side and a spaced apart parallel second end side, a first transverse lengthwise side and a parallel spaced apart second transverse lengthwise side, the first transverse rigid submergible plate spaced apart from and parallel to the second transverse rigid submergible plate,
      ii. the two transverse deformable submergible walls including a first transverse deformable submergible wall having a top side and a parallel spaced apart bottom side, a first lengthwise side and a parallel spaced apart second lengthwise side, and a second transverse deformable submergible wall having a top side and a parallel spaced apart bottom side, a first lengthwise side and a parallel spaced apart second lengthwise side, the first transverse deformable submergible wall spaced apart from and parallel to the second transverse deformable submergible wall, iii. the first transverse rigid submergible plate flexibly connected at its first transverse lengthwise side to the top side to the first rigid submergible plate, the first transverse rigid submergible plate flexibly connected at its second transverse lengthwise side to top side to the second rigid submergible plate, the second transverse submergible rigid plate flexibly connected at its first transverse lengthwise side to the bottom side to the first rigid submergible plate, the second transverse rigid submergible plate flexibly connected at its second transverse lengthwise side to bottom side to the second rigid submergible plate, iv. the first transverse rigid submergible plate flexibly connected at its first end side to the top side of the first transverse deformable submergible wall, the first transverse rigid submergible plate flexibly connected at its second end side to top side to the second transverse deformable submergible wall, the second transverse rigid submergible plate flexibly connected at its first end side to the bottom side of the first transverse deformable submergible wall, the second transverse rigid submergible plate flexibly connected at its second end side to bottom side to the second transverse deformable submergible wall;

b. at least one one-way intake valve, the at least one one-way intake valve allowing said sea water to enter the deformable submergible bladder;

c. at least one outlet incorporated into the deformable bladder, into the second transverse rigid submergible plate and into a conduit pipe, the second transverse rigid submergible plate is affixed to the conduit pipe, the outlet allowing said sea water to exit the deformable submergible bladder and through the second transverse rigid submergible plate and into the conduit pipe;

d. a submergible wave collector affixed to the first end side and to the second end side of the first transverse rigid submergible plate, the submergible wave collector serving as a top of the biomorphic wave energy collector and the submergible wave collector configured to open when used in conjunction with sea water when impacted by sea water;

e. an anchoring attachment; and f. the first rigid submergible plate, the second rigid submergible plate, the first transverse rigid submergible plate, the first transverse deformable submergible wall and the second transverse deformable submergible wall flexibly reducing the volume of the deformable submergible bladder in response to the motion of a wave surge against the wave collector and at least one of the first rigid submergible plate and the second rigid submergible plate;

g. when the wave collector experiences an underwater surge of a wave, the wave collector is pushed from its original position by a directional force from the underwater surged of the wave, and the wave collector and the first rigid submergible plate, the second rigid submergible plate, the first transverse rigid submergible plate, the first transverse deformable submergible wall and the second transverse deformable submergible wall move from an original position transverse to the conduit pipe to move laterally and downwardly toward the conduit pipe to thereby compress and decrease the volume in the deformable submergible bladder and the sea water which is forced into the bladder from the at least one one-way intake valve is forced out of the bladder through the outlet and into a hose in the conduit pipe enabling the sea water to be inserted into the hose and flow to a hose outlet at a shoreline, and when a surge wave has passed, a force of a returning wave causes the wave collector and the first rigid submergible plate, the second rigid submergible plate, the first transverse rigid submergible plate, the first transverse deformable submergible plate and the second transverse deformable submergible plate to return to their original position and the bladder is expanded to its original volume until the wave collector receives another force from the sea water to again repeat a bladder compression process and repeat a sea water exit process from the deformable compressible bladder to the hose in the conduit pipe.

2. A sea fan apparatus submerged in and used in conjunction with sea water adjacent a coastal shoreline, the sea fan apparatus comprising:

a. a generally rectangular housing having a first side, a second side, a third side, a fourth side, a first deformable side and a second deformable side, the first side and second side being generally rigid and positioned opposite to each other, the first side having a given length and a given width and the second side having a given length and a given width, the given length of the first side and the second side being identical and the given width of the first side and the second side being identical, the third side and the fourth side being generally rigid and positioned opposite to each other, the third side having a given length and width and the fourth side having a given length and width, the given length of the third side being the same as the given length of the fourth side and the given width of the third side being the same as the given length of the fourth side, the third side flexibly connected at a first lengthwise side to a top widthwise side of the first side and the first side flexibly connected at an opposite lengthwise side to a top widthwise side of the second side, the fourth side flexibly connected at a first lengthwise side to a bottom widthwise side of the first side and the fourth side flexibly connected at an opposite lengthwise side to a bottom widthwise side of the second side, the third side is a top of the generally rectangular housing and the fourth side is a bottom of the generally rectangular housing, the first deformable side having a given length and a given width, the first deformable side flexibly connected at a first end side to a first widthwise side of the third side, flexibly connected at a second end side to a first widthwise side of the fourth side, flexibly connected at a first lengthwise side to a first lengthwise side of the first side and flexibly connected at a second lengthwise side to a second lengthwise side of the second side, the second deformable side having a given length and a given width, the second deformable side flexibly connected at a first end side to a second widthwise side of the third side, flexibly connected at a second end side to a second widthwise side of the fourth side, flexibly connected at a first lengthwise side to a second lengthwise side of the first side and flexibly connected at a second lengthwise side to a second lengthwise side of the second side;

b. the first side, the second side, the third side, the fourth side, the first deformable side and the second deformable side respectively connected to create a sealed interior chamber around a deformable bladder, the generally rectangular housing having at least one one-way intake valve, the at least one one-way intake valve allowing said sea water to enter the deformable bladder;

c. the fourth side releasably attached to a conduit pipe by an attachment member, and at least one outlet, the at least one outlet incorporated into the deformable bladder and extending through the fourth side, the at least one outlet allowing said sea water to exit the deformable bladder and into a hose within the conduit pipe, a sea fan wave collector being generally circular in shape and affixed adjacent a first widthwise side and an opposite second widthwise side of the third side, the sea fan wave collector being double sided with a circumferential wall and a central surface, the sea fan wave collector, the first side, the second side, the third side, the fourth side, the first deformable side and the second deformable side are submergible within a body of sea water; and d. the hose is of sufficient length to extend into the shoreline, and when the sea fan wave collector experiences an underwater surge of a wave, the sea fan wave collector and the first side, the second side, the third side, the first deformable side and the second deformable side are pushed by a directional force of the wave and moves laterally and downwardly relative to the conduit pipe, thereby causing the sea fan wave collector, the first wall, the second wall, the third wall, the first deformable wall and second deformable wall to move laterally and downwardly relative to the conduit pipe while the first side and the second side remain parallel to each other and the third side and the fourth side remain parallel to each other, and the first deformable side and the second deformable side remain parallel to each other causing the deformable bladder to be compressed so that sea water which enters the deformable bladder through the one-way intake valve is forced out of the deformable bladder through the at least one outlet to force water under pressure into the hose and under pressure out of the hose.

\* \* \* \* \*